United States Patent

[11] 3,623,737

| [72] | Inventor | Edwin J. Eckert |
| | | Peoria, Ill. |
| [21] | Appl. No. | 888,288 |
| [22] | Filed | Dec. 29, 1969 |
| [45] | Patented | Nov. 30, 1971 |
| [73] | Assignee | Caterpillar Tractor Co. |
| | | Peoria, Ill. |

[54] FACE SEALS
10 Claims, 6 Drawing Figs.

[52] U.S. Cl. .................................................. 277/92
[51] Int. Cl. .......................................... F16j 15/34
[50] Field of Search .................................. 277/82, 92, 93

[56] References Cited
UNITED STATES PATENTS

| 3,086,782 | 4/1963 | Peickii et al. ................. | 277/92 |
| 3,524,654 | 8/1970 | Hasselbacher et al. ........ | 277/92 |

*Primary Examiner*—Robert I. Smith
*Attorney*—Fryer, Tjensvold, Feix, Phillips and Lempio ABSTRACT: A formed, sheet-metal face seal is provided which utilizes loading means to bring seal faces of relatively rotatable parts into operative, fluidtight engagement. The seal comprises a frustoconical annulus having a generally radially extending flange joined to the larger diameter end, which flange defines a face for sealing against a relatively rotating surface.

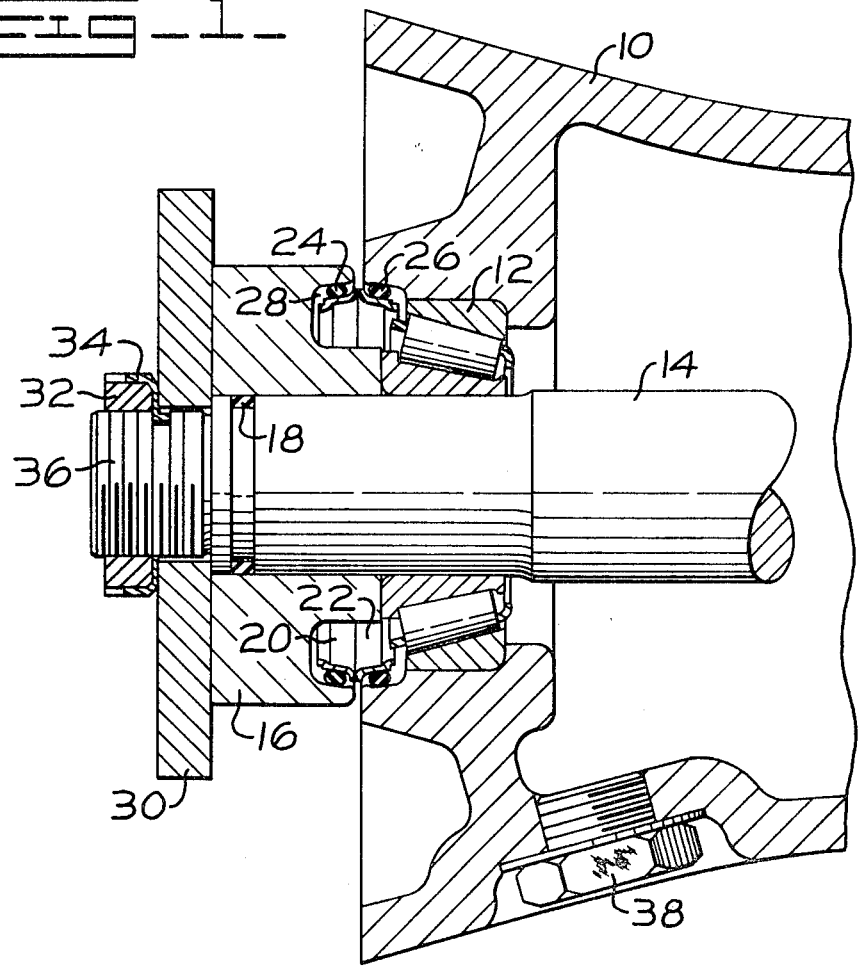
Fig_1_
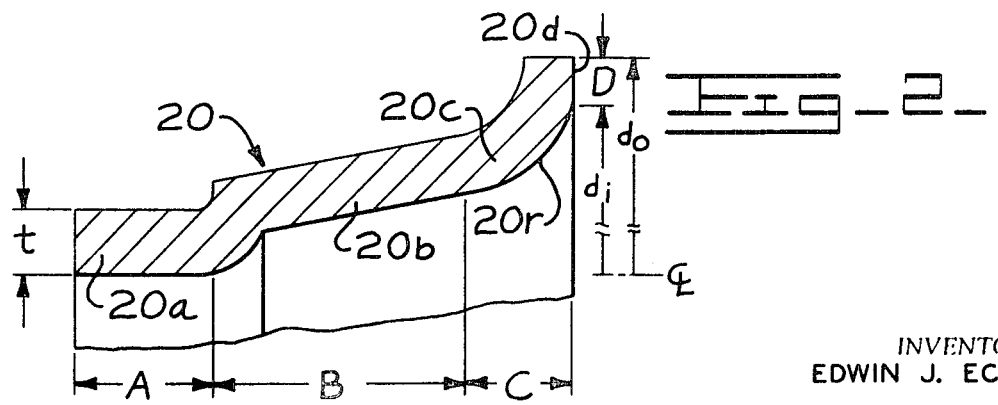
Fig_2_
INVENTOR
EDWIN J. ECKERT

INVENTOR
EDWIN J. ECKERT

FACE SEALS

BACKGROUND AND SUMMARY OF THE INVENTION

This invention relates to seals of the kind employed for retaining lubricant and excluding foreign matter from the vicinity of bearing surfaces from relatively moving parts and particularly to face-type seals wherein sealing is accomplished by mating surfaces of relatively rotating seal parts of hard material. The invention is particularly directed to face seals which are made from thin sheet metal and relates to the type disclosed in U.S. Pat. No. 3,180,648, assigned to the assignee of this application.

The present invention is described and illustrated herein in its application to the cable fair-lead guide roller of a track-type tractor which is notably subject to operation in environments which are highly destructive to seals. It is well known, for example, that the failure of roller seals causes failure and destruction of the other components of the roller long before the expiration of its intended service life. Inadequacy of the seals has lead to the practice of frequent abundant lubrication of the roller. Since lubricant is introduced under pressure, its use has been responsible for rupturing the bellows-type protective members often employed with seal rings or for actually forcing abrasive substances or other foreign matter between sealing surfaces. In this manner, lubricant escapes and foreign matter is permitted to enter the bearing compartments of the rollers to effect their destruction.

Many seals of the prior art have employed flat lapped surfaces in face-to-face contact and of considerable area. In other words, wide annular sealing bands between relatively rotating parts have been erroneously considered superior to narrow bands. It has been discovered, however, that wide bands produce excessive fretting and galling due to the inability of the lubricant to reach the outer extremity of the seal band, and therefore, tend to destroy themselves in service.

Prior to the advent of the invention described in U.S. Pat. No. 3,180,648, it had been generally accepted knowledge in the track-type tractor industry that track roller life in large tractors is limited to a few hundred hours because of seal failure and inadequate lubrication resulting therefrom. The industry has striven toward production of seals that would perform consistently for 500 hours or more without replacement. The cast seals of the aforementioned patent performed substantially longer periods than did prior art seals. Like the cast seals of the aforementioned patent, the sheet metal seals of the present invention have performed for substantially longer periods than have prior art seals.

Unlike the prior patent seals, however, the seal of the present invention is formed of a flexible sheet metal material and is considerably more economical to produce. Thus the seal of the present invention may be expected to endure and function satisfactorily for a much greater length of time than most prior art seals as well a being considerably less expensive.

While the seal of the present invention is described in connection with tractors, where it has proven its superiority and service conjunction with guide rollers, track rollers, carrier rollers, and final drive mechanisms, all subject to severe service conditions, it is by no means limited to such service but is applicable to many uses where perfect fluid seal between relatively rotating parts is desired.

The size of seal rings usually has a practical limitation arising from the space in which they are to be used and the cost of material of which they are formed. Since considerable pressure is necessary to maintain the mating surfaces of the rings in sealing contact under operating conditions, the rings are also subject to distortion in use. Consequently, rings with perfectly flat or otherwise complimentary mating surfaces are so distorted in use that only marginal edges of their annular sealing bands are in contact. The present invention is predicated on the fact that it is desirable for the annular sealing faces of a pair of mating seal faces to have a slight variation from perfect mating. It is also desirable, for reasons to be set forth in the following specification, that the variation from the flat or perfectly mating surfaces be such as to cause positive contact at a pressure at the inner rather than the outer margin of the annular sealing areas.

It is, therefore, among the objects of the present invention to provide at least one ring-type, seal member which utilizes the deformity caused by pressure applied to such member in service as well as deformity caused by temperature due to friction to provide good sealing characteristics.

A further object is to provide seal rings which insure that the annular contacting or sealing areas of two such rings, which are brought into face-to-face relationship under pressure, will occur at the inner rather than the outer marginal edges of their annular sealing bands.

A still further object of this invention is to provide a formed, sheet metal seal ring which compensates for the deflection of the ring under service conditions and achieves a good seal with a mating surface in the "as-formed" condition without the necessity of expensive finishing operations.

A still further object of the invention is to provide sealing rings which are made of formed, sheet metal material which due to their simple construction are more economical than conventional cast sealing rings.

Further and more specific objects and advantages of the present invention and in the manner in which it is carried into practice are made apparent in the following specification wherein the invention is described in detail by reference to the accompanying drawings.

BRIEF DESCRIPTION OF THE DRAWINGS

FIG. 1 is an elevation view in cross section showing an installation of face sealing rings in a bearing compartment of a cable fair-lead guide roller for purposes of lubricant retention;

FIG. 2 is an enlarged, fragmentary cross-sectional view of a sealing ring of FIG. 1 showing its shape in detail;

DETAILED DESCRIPTION

Figure 3:
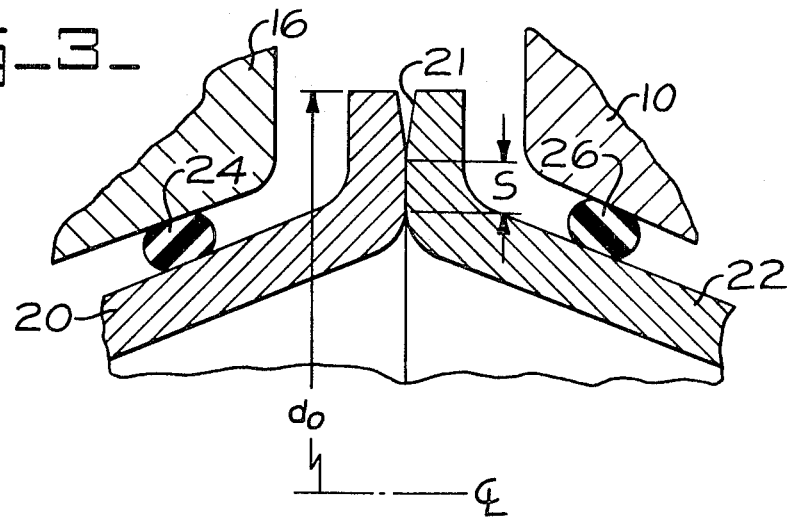
FIG. 3 is an enlarged, fragmentary cross-sectional view of the sealing rings of FIG. 1 illustrating the area contact between mating rings.

Referring to FIG. 1, there is shown a guide roller 10 mounted on a pair of roller bearings, one of which is shown at 12. The internal diameter of said bearing is press fit on the stepped, end portion of shaft 14. A retainer 16 is also press fit onto the stepped end portion of the shaft 14 which contains an O-ring seal 18 to preclude leakage of lubricant contained in the bearing compartment 28 around the shaft circumference. A pair of identical sheet metal sealing rings or members 20, 22 are retained in face-to-face engagement by means of identical toric rings 24, 26, respectively, and may be made of any elastomeric material having good sealing properties, such as rubber. A lubricant is maintained in bearing compartment 28 by means of the toric rings for the purpose of lubricating bearing 12. The retainer 16 is retained on the shaft 14 by means of end plate 30 which is, in turn, retained by nut 32 and lock washer 34 on the stepped, end portion of shaft 14 by means of threads 36. A threaded plug 38 is provided on guide roller 10 to facilitate filling and draining of lubricant.

FIG. 2 is an enlarged cross-sectional view of a portion of a sealing ring 20 or 22 of FIG. 1. The ring is generally in the shape of a sheet metal annulus of uniform thickness which is symmetrical about a central axis. Such thickness is preferably selected from the range of from 0.025 inch to 0.060 inch. This range was arrived at after conducting a series of experimental tests to determine the thickness and related geometric and structural design parameters required to provide the desirable flexibility and other design criteria for efficient engagement of the mating faces. An optimum thickness appears to be about 0.030 inches. While the aforementioned range is preferred, 0.104 inch thick seals have been used with adequate sealing characteristics in certain limited applications. However, slightly longer wear life results in the latter case because of the added material. Also, the added material reduces the desired flexibility. Below the 0.025 inch lower limit the ring is too thin to function from a structural standpoint.

The sealing ring is generally a frustoconical annulus having a larger end and a smaller end as indicated by the extremities of portion 20b of length B. at the smaller end there is joined a longitudinally extending lip portion 20a of length A of a diameter smaller than that of said smaller end and in which said longitudinally extending lip portion facilitates the installation of previously described toric ring on the seal in a manner to be described hereinbelow.

While the lip portion 20a is provided on the back of the seal ring for toric retention and positioning it is not absolutely needed for proper installation and operation of the seal. The lip portion 20a may extend from the frustoconical annulus portion 20b in stepped fashion as shown best in FIG. 2, or it may be a smooth extension of said frustoconical annulus. At the larger end there is joined a generally radially outwardly extending flange portion 20c of length C and of curved surface 20r having a face portion 20d of length D, which face portion mates with the identical face portion of a corresponding ring to produce a metal-to-metal sealing effect.

A suitable lubricant is maintained in bearing compartment 28 for the purpose of lubricating bearing 12. The toric rings 24, 26, function to retain such lubricant in the bearing compartment 28 and ring 24 additionally frictionally retains seal ring 20 stationary with respect to shaft 14 while seal ring 22 rotates with guide roller 10.

Face portion 20d may be left in the "as formed" seal face configuration as well as in the lightly sanded condition. The preferred seal composition consists of carbon steel in a range of SAE 1040 through SAE 1080. After forming by means of spinning on a lathe, stamping with conventional sheet metal press equipment, or by utilizing other conventional forming methods, the parts are preferably thru-hardened to a hardness of from Rockwell C–62 to C–67. By using a high carbon steel selected from the aforementioned range, good abrasion resistance and good spring characteristics are achieved which permit the seal to maintain contact with the mating face of the corresponding seal or surface. Lapping of the seal face is not required as with prior art seals because of the ease in conforming to the mating surface due to the flexibility inherent in the materials used and as a result of the thin face presented.

In operation, two sealing rings 20, 22 are placed in face-to-face contact as shown in FIG. 1. Each of the sealing rings is supported by a corresponding toric ring 24, 26, of elastomeric material as shown compressed between the inclined surface of the ring and the retaining member. Initially, the toric rings 24, 26 are stretched over the exterior of the longitudinally extending flange portions A of their seals 20 and 22, respectively. Lack of a taper on portion 20a allows the toric rings to remain stationary with respect to the seal on which it is mounted and thus facilitates seal installation.

The seals in face-to-face relation are then located on the end of shaft 14. Retainer 16 is then located on the end of shaft 14 such that the inclined inner surfaces of the retainer 16 and guide roller 10 contact the toric rings 24 and 26, respectively. End plate 30, lock washer 34 and nut 32 are then located on the end of shaft 14 and nut 32 is turned such that the retainer 16 and guide roller 10 are moved toward each other. The toric rings 24, 26 are by this movement rolled onto the inclined outer face of seal by means of the force transmitted to the toric rings by the inclined inner surfaces of the retainer 16 and guide roller 10. The inclined surfaces of the rings and retaining members are dimensioned such that upon onward movement of retainer 16 with respect to shaft 14 the toric rings act in the manner of springs to bring the seal rings 20, 22 into face-to-face contact under pressure at a spring rate that is fairly constant during a large increment of movement. Thus, the face-to-face contact is maintained even as the wearing of the sealing ring faces proceeds.

The area of contact at the face of the two sealing rings is called a sealing band. At assembly, the sealing band is located at the break-over point of the flat band and the radius, i.e. at the point of intersection of the curved surface 20r and face 20d of length D in FIG. 2. This sealing band begins at the inner diameter $d_i$ of the face 20d and ends short of the outer diameter $d_o$ as measured from the ring axis, thus producing an area of no contact at the outer diameter of the seal ring.

Figure 4:
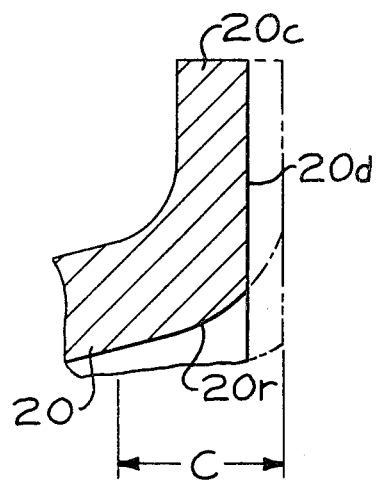
FIGS. 4-6 are enlarged, fragmentary cross-sectional views of a sealing ring showing progressive stages of wear of the ring face.
Figure 5:
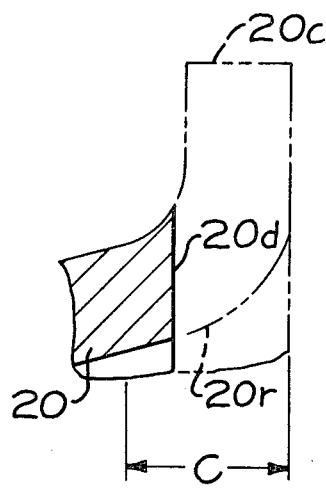

With two seal rings in face-to-face relation and loaded by load means such as toric rings 24, 26, there exists "v" shaped notch 21 with the open end of the notch at the outer diameter $d_0$ and the bottom at the point where the seal band of length S begins as best seen in FIG. 3. The "v-notch" or gap is created by a combination of factors including the force exerted by the loading means deflecting the radially extending flange portion 20c and the dimensions, material and hardness of said flange portion. The use of sheet metal, with its inherent resiliency, facilitates this desired deflection. As the seal wears in its abrasive environment, the wear proceeds axially, with the face 20d becoming wider and the sealing band, in effect, moving radially inwardly toward the ring axis along the curved surface 20r as best seen in FIGS. 4 and 5.

Figure 6:
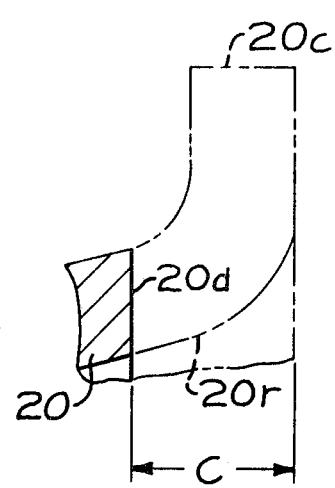

As the axial wear progresses, the radially extending flange of the ring becomes thinner and thinner until the seal rings approach a frustoconical shape as best seen in FIG. 6. In other words, the radially extending flange portion 20c is gradually ground away in use until only frustoconical portion 20b remains. At this point the seal is generally considered to be worn out and is discarded. The seal group continues to function in keeping oil in and abrasives out as long as the toric rings supply sufficient face load since the wear is substantially the same on both seals.

Tests have indicated that in addition to using a pair of the subject seal rings, a single ring acting against a flat machined face, such as the housing, functions reasonably well.

It is understood that the foregoing description is merely illustrative of a preferred embodiment of the invention and that the scope of the invention is not to be limited thereto, but is to be determined by the scope of the claims.

What is claimed is:

1. The combination of a pair of mating seal rings and loading means for applying a load to the rings in an axial direction to engage the seal rings in rotary, fluid-sealing contact, each of said rings comprising a sealing member comprising a formed sheet metal, frustoconical annulus having a larger diameter end and a smaller diameter end, each annulus having a generally radially outwardly extending flexible flange joined to its larger diameter end, which flange defines a face portion which is in sealing contact with the corresponding face portion of the mating seal ring over a sealing band radially inward of the outermost flange portion thus defining an annular "v" shaped notch with the open end of the "v" being at said outermost flange portion and the bottom of the "v" being at the radially outermost portion of the sealing band.

2. The seal rings as defined in claim 1 further including a longitudinally extending, cylindrical lip portion which is joined to the smaller diameter end of each frustoconical annulus, thereby to provide a surface for toric retention and positioning and thus facilitate installation of said seal rings.

3. The seal rings defined in claim 2 wherein said extending lip portion is of a diameter less than that of the smaller end of the frustoconical annulus to which it is joined such that the lip portion is stepped with respect to said annulus.

4. The combination of a seal ring and loading means for applying a load to the ring in an axial direction for engaging the ring with a relatively rotatable mating part, said seal ring comprising a sealing member comprising a formed sheet metal, frustoconical annulus having a larger diameter end and a smaller diameter end, said annulus having a generally radially outwardly extending flexible flange joined to its larger diameter end, which flange defines a face portion for mating with said mating part over a sealing band radially inward of the outermost flange portion thus defining an annular "v" shaped notch with the open end of the "v" being at said outermost flange portion and the bottom of the "v" being at the radially outermost portion of the sealing band.

5. The seal ring as defined in claim 4 further including a longitudinally extending, cylindrical lip portion which is joined to the smaller diameter end of said frustoconical annulus, thereby to provide a surface for toric retention and positioning and thus facilitate installation of said seal ring.

6. The seal ring defined in claim 5 wherein said extending lip portion is of a diameter less than that of the smaller end of the frustoconical annulus such that the lip portion is stepped with respect to said annulus.

7. A seal member comprising a formed sheet metal, axially extending frustoconical annulus having a larger diameter end and a smaller diameter end, said annulus having a generally radially outwardly extending flexible flange joined to the larger diameter end, which flange defines a face portion for sealing against a relatively rotating surface, said face portion being constructed of the same material as the remainder of the seal member producing a seal member of homogeneous material, said frustoconical annulus defining an inclined outer surface on the axial portion engaged by a compressible toric ring which applies a load which serves to hold said face against said relatively rotating surface and means whereby the area of sealing contact between the face portion and the mating surface is over the entire face portion when the seal member is unloaded by said toric ring and narrowing down to a sealing band located inwardly of the outermost flange portion when the seal member is loaded by the toric ring, and further including a second one of said seal members and a toric ring engaged therewith, said seal members being in face-to-face contact over a sealing band radially inward of the outermost flange portion thus defining an annular "v" shaped notch with the open end of the "v" being at said outermost flange portion and the bottom of the "v" being at the radially outermost portion of the sealing band.

8. The seal members of claim 7 wherein said seal members are of uniform thickness and the shape of said flange defines a smooth curve transcending from the larger diameter end of each annulus.

9. The seal members as defined in claim 7 further including a longitudinally extending, cylindrical lip portion joined to the smaller diameter end of each frustoconical annulus, thereby to provide a surface for toric retention and positioning and thus to facilitate installation of the seal members.

10. The seal member defined in claim 9 wherein said cylindrical lip portion is of a diameter less than the smaller end of the frustoconical annulus to which it is joined such that the lip portion is stepped with respect to said annulus.

* * * * *